(12) United States Patent
Moon

(10) Patent No.: US 7,524,099 B2
(45) Date of Patent: Apr. 28, 2009

(54) LIQUID CRYSTAL DISPLAY

(75) Inventor: Jong Won Moon, Hogye-dong (KR)

(73) Assignee: LG. Display Co., Ltd., Seoul (KR)

( * ) Notice: Subject to any disclaimer, the term of this patent is extended or adjusted under 35 U.S.C. 154(b) by 674 days.

(21) Appl. No.: 11/136,830

(22) Filed: May 25, 2005

(65) Prior Publication Data

US 2006/0007101 A1 Jan. 12, 2006

(30) Foreign Application Priority Data

May 31, 2004 (KR) .................. 10-2004-0038846

(51) Int. Cl.
*F21V 7/04* (2006.01)

(52) U.S. Cl. .................. 362/607; 362/19; 362/618; 345/88; 349/64

(58) Field of Classification Search .................. 362/19, 362/606, 607, 618; 345/87, 88, 102; 349/61, 349/62, 64

See application file for complete search history.

(56) References Cited

U.S. PATENT DOCUMENTS 6,657,607 B1 12/2003 Evanicky et al.
2006/0082700 A1* 4/2006 Gehlsen et al. .............. 349/64

* cited by examiner

*Primary Examiner*—Stephen F Husar
(74) *Attorney, Agent, or Firm*—Brinks Hofer Gilson & Lione

(57) ABSTRACT

A liquid crystal display and method of reducing light leakage in a black mode of a liquid crystal display is provided. In the liquid crystal display, a backlight assembly generates light, and a display unit is disposed over the backlight assembly to display an image by using light received from the backlight assembly. A DBEF (dual brightness enhanced film) is attached to a lower polarization plate provided at the display unit. A brightness control plate is interposed between the lower polarization plate and the DBEF to reduce the brightness of an inclined incident light that is not perpendicular to an absorbing axis of the polarization plate.

15 Claims, 7 Drawing Sheets

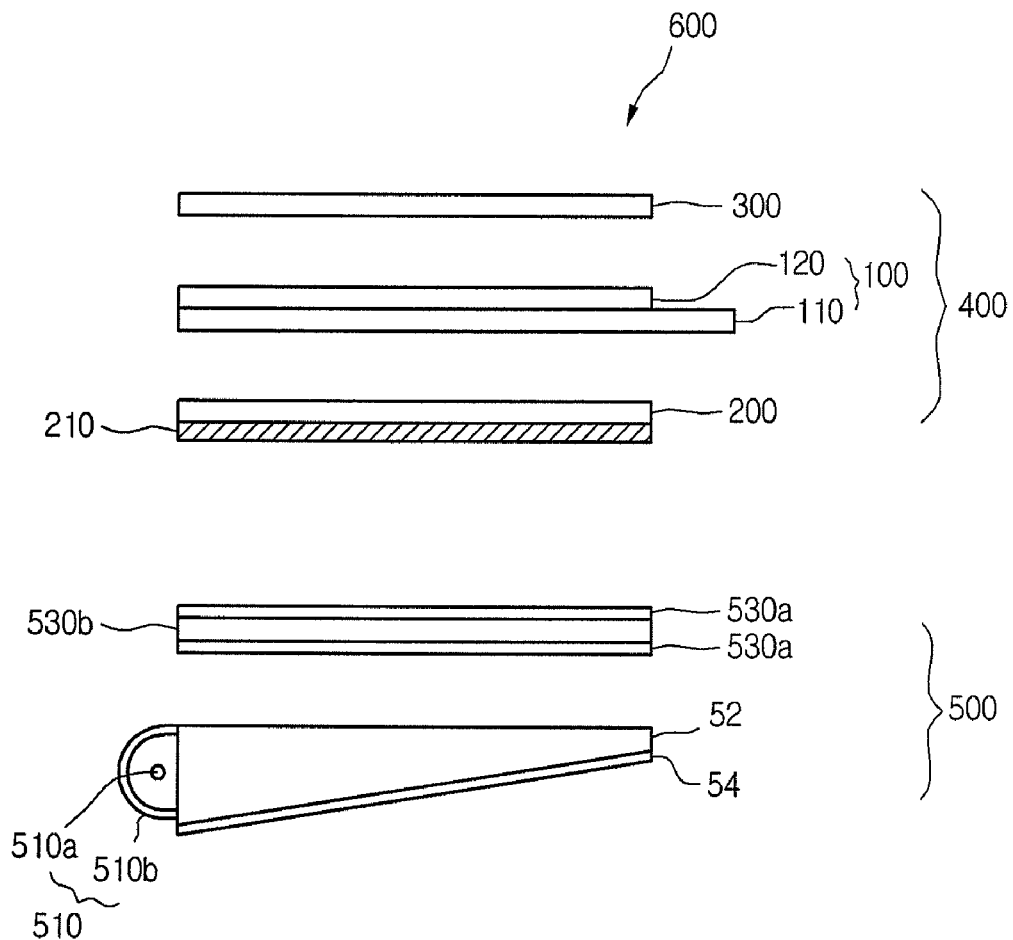

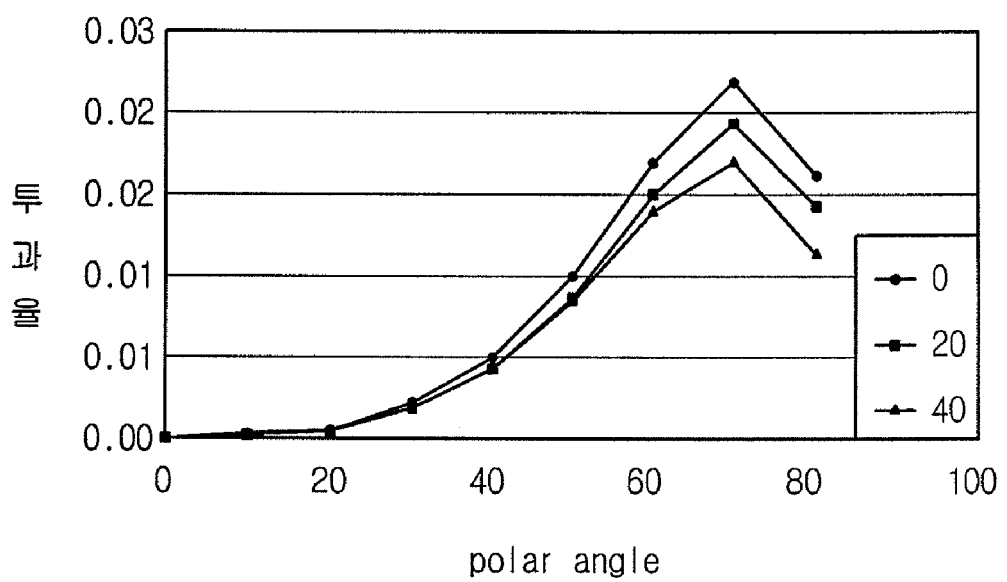

LIQUID CRYSTAL DISPLAY

CLAIM FOR PRIORITY

This application claims the benefit of priority to Korean Application 2004-38846, filed on May 31, 2004, which is herein incorporated by reference.

FIELD OF THE INVENTION

The present invention relates to a liquid crystal display, and more particularly, to a liquid crystal display capable of providing an improved contrast ratio.

DESCRIPTION OF THE RELATED ART

A cathode ray tube (CRT) is disadvantageous in its heavy weight and large volume. Recently, various flat panel displays for overcoming such disadvantages of the CRT are being developed.

Examples of the flat panel displays include a liquid crystal display (LCD), a filed emission display (FED), a plasma display panel (PDP), and an electro-luminescence display (ELD). Research for increasing the display quality and screen size of the flat panel display is being actively conducted.

The LCD is a kind of non-emissive display that produces an image by using a light source such as a lamp, and is advantageous because of its small size, light weight and low power consumption. The LCD displays an image on a screen by using the electrical and optical characteristics of liquid crystal injected into an LCD panel, that is, between a TFT substrate and a color filter substrate.

Since the liquid crystal injected into the LCD panel is not self-luminescent material but non-emissive material, that is, light-receiving material for producing an image by adjusting the amount of light received from the outside, the LCD essentially needs a separate device such as a backlight assembly for irradiating light onto the LCD panel.

The backlight assembly is broadly classified into a direct type and an edge type. The direct type backlight assembly uses lamps arranged below the LCD panel to directly irradiate light onto the LCD panel, and is disadvantageous in its high power consumption, high unit cost and large thickness.

On the contrary, the edge type backlight assembly uses a lamp such as a cold cathode fluorescent lamp (CCFL) disposed at one side or both sides of the LCD panel, a light guide plate, and a reflection plate to illuminate the LCD panel, and is being widely used because of its slimness, light weight and low power consumption. However, the edge type backlight assembly is disadvantageous in that it needs the light guide plate for guiding light received from the side to the front.

The edge type backlight assembly includes a mold frame having a receiving space formed therein, a reflection sheet installed at a bottom surface of the receiving space to reflect light toward an LCD panel, a light guide plate installed on the reflect sheet to guide light, a lamp unit installed between the light guide plate and a sidewall of the receiving space to emit light, optical sheets stacked on the light guide plate to diffuse and collect light, and a top chassis installed over the mold frame to cover the side walls of the mold frame from a edge portion of the LCD panel.

Here, the optical sheets may include a diffusion sheet for diffusing light, a prism sheet stacked on the diffusion sheet to collect the diffused light and transfer the collected light to the LCD panel, and a protective sheet for protecting the diffusion sheet and the prism sheet.

FIG. 1 is a sectional view illustrating a structure of a related art LCD.

Here, FIG. 1 illustrates an LCD using the edge type backlight assembly.

Referring to FIG. 1, an LCD 60 includes a backlight assembly 50 for generating light, and a display unit 40 disposed over the backlight assembly 50 to display an image by using light received from the backlight assembly 50.

The backlight assembly 50 includes a lamp unit 51 for generating light, a light guide unit for guiding light from the lamp unit 51 to an LCD panel 10.

The display unit 40 includes the LCD panel 10, and lower and upper polarization plates 20 and 30 disposed under and over the LCD panel 10. The LCD panel 10 includes a TFT substrate 11 having an electrode formed thereon, a color filter substrate 12, and a liquid crystal layer (not shown) injected between the TFT substrate 11 and the color filter substrate 12.

The lamp unit 51 includes a lamp 51a for generating light, and a lamp reflection plate 51b surrounding the lamp 51a. Light generated from the lamp 51a is inputted to a light guide plate 52, which will be described layer, and the lamp reflection plate 51b reflects light generated from the lamp 51a toward the light guide plate 52 to increase the amount of the light inputted to the light guide plate 52.

The light guide unit includes a reflection plate 54, the light guide plate 52, and optical sheets 53. The light guide plate 52 is provided at one side of the lamp unit 51 to guide light from the lamp unit 51. At this time, the light guide plate 52 changes a path of light outputted from the lamp unit 51 to guide the light toward the LCD panel 10.

The reflection plate 54 is disposed beneath the light guide plate 52 to reflect light leaking from the light guide plate 52 toward the light guide plate 52.

The optical sheets 53 are disposed over the light guide plate 52 to improve the efficiency of light outputted from the light guide plate 52.

The optical sheets 53 include a diffusion sheet 53a, and a dual brightness enhanced film (DBEF) 53b disposed over the diffusion sheet 53a, and may further include a prism sheet (not shown) and a protective sheet (not shown).

The DBEF 53b reflects a reflected and lost portion of light transmitted from the lamp unit 51 to the display unit 40 toward the display unit 40. That is, the DBEF 53b improves light efficiency by preventing light from being lost.

FIG. 2 is a sectional view of the display unit shown in FIG. 1. The transmittance of lights that are inputted to the display unit 40 in a normally black mode will now be described with reference to FIG. 2.

Referring to FIG. 2, the display unit 40 includes a TFT substrate 11, a color filter substrate 12, a liquid crystal layer 13 formed between the substrates 11 and 12, a lower polarization plate (polarizer) 20 attached beneath the TFT substrate 11, and an upper polarization plate (analyzer) 30 attached on the color filter substrate 12. At this time, an absorbing axis of the lower polarization plate 20 is perpendicular to an absorbing axis of the upper polarization plate 30.

As illustrated in FIG. 2, lights A and B inputted to the display unit 40 have polar angles of about 45° and 0°, respectively. The light B travels in parallel with the absorbing axes of the lower and upper polarization plates and is absorbed by the lower and upper polarization plates without being leaked in the normally black mode. However, the light A is inputted at an inclined angle with respect to the lower or upper polarization plate 20 or 30 and finally penetrates the upper polarization plate 30.

That is, light leakage is generated in the normally black mode due to the incidence of the light A.

FIG. 3 is a diagram illustrating the brightness distribution of incident light according to its azimuthal angles in the structure shown in FIG. 2.

As illustrated in FIG. 3, the brightness distribution of the incident lights is generated in a circular shape. Accordingly, light A whose azimuthal angles are not perpendicular or parallel to the absorbing axes exhibit high brightness. Consequently, light leakage is generated in a normally black mode due to the light A, thereby causing degradation in a CR ratio.

SUMMARY OF THE INVENTION

A liquid crystal display is provided that prevents light leakage that may be generated in a normally black mode due to inclined incident light that is not perpendicular to an absorbing axis of a polarization plate, by attaching a brightness control plate on a lower surface of a lower polarization plate.

By way of introduction only, in one aspect a liquid crystal display includes: a backlight assembly for generating light; a display unit disposed over the backlight assembly to display an image by using light received from the backlight assembly; a DBEF disposed under a lower polarization plate provided at the display unit; and a brightness control plate interposed between the lower polarization plate and the DBEF to reduce the brightness of inclined incident light that is not perpendicular to an absorbing axis of the polarization plate.

In another aspect of the present invention, there is provided a liquid crystal display including: a backlight assembly for generating light; a display unit disposed over the backlight assembly to display an image by using light received from the backlight assembly; and a brightness control plate attached to a lower polarization plate provided at the display unit to reduce the brightness of inclined incident light that is not perpendicular to an absorbing axis of the polarization plate.

In another aspect, a method of reducing light leakage in a black mode of a liquid crystal display is presented. The method includes generating light; polarizing the light through a polarizing plate; and reducing a brightness of inclined incident light that is not perpendicular to an absorbing axis of the polarization plate prior to polarizing the light during the black mode of the liquid crystal display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a sectional view illustrating a structure of an LCD according to another embodiment of the present invention; and FIGS. 6A and 6B are diagrams illustrating that light leakage is prevented by the LCD according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
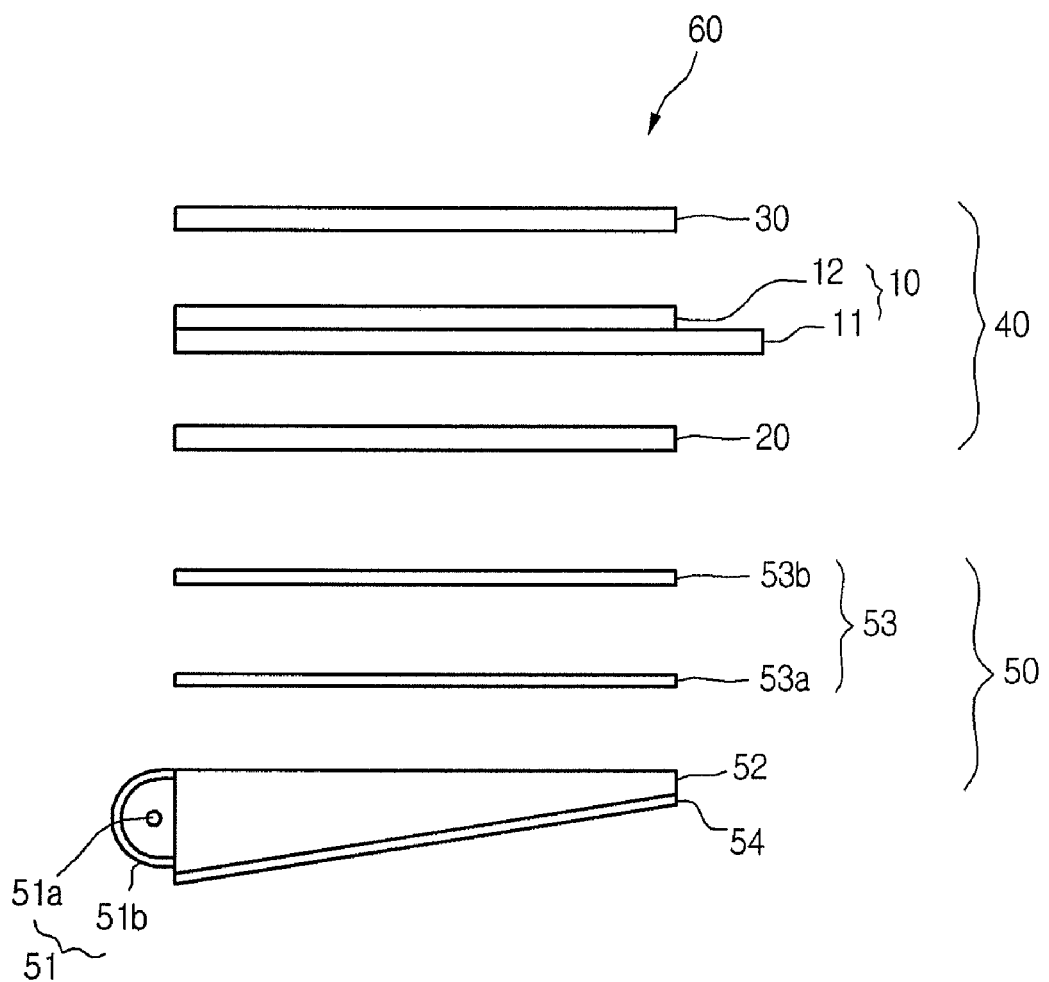
FIG. 1 is a sectional view illustrating a structure of a related art LCD.
Figure 2:
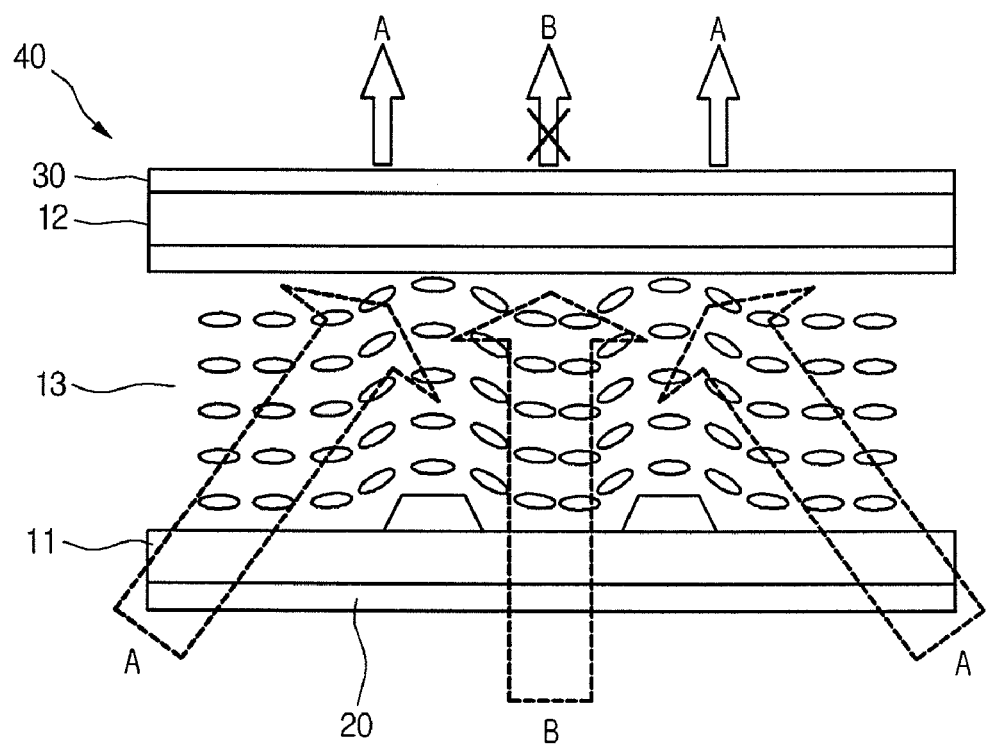
FIG. 2 is a sectional view of a display unit shown in FIG. 1.
Figure 3:
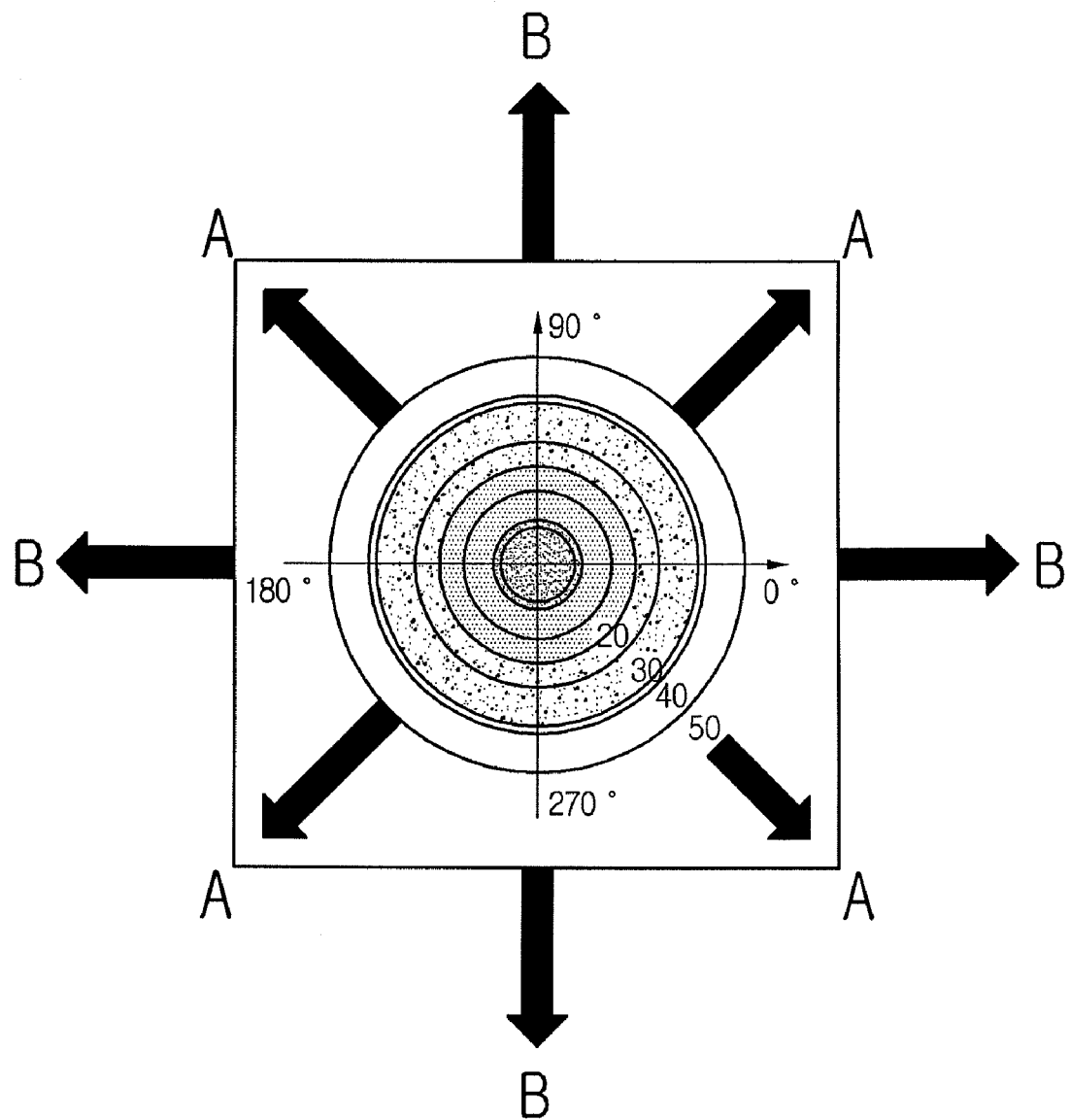
FIG. 3 is a diagram illustrating the brightness distribution of incident light according to its azimuthal angles.
Figure 4:
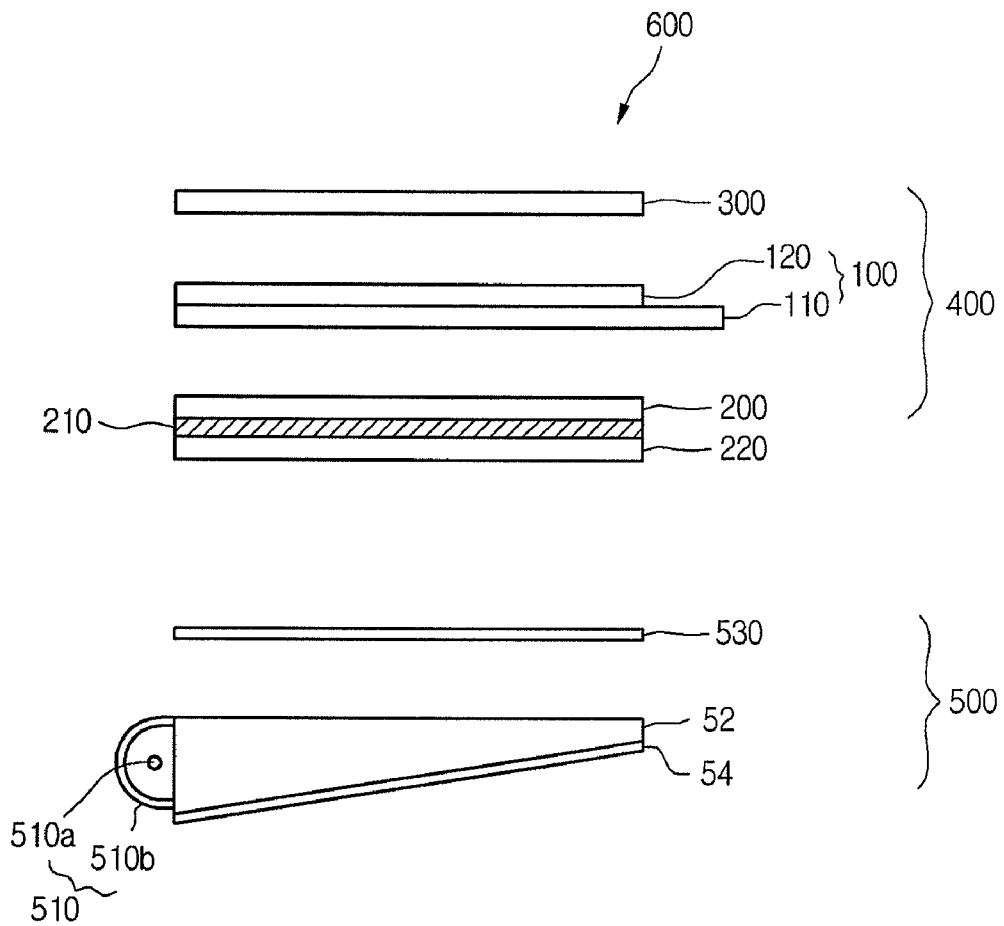
FIG. 4 is a sectional view illustrating a structure of an LCD according to an embodiment of the present invention.

FIG. 4 is a sectional view illustrating a structure of an LCD according to an embodiment of the present invention.

Here, FIG. 4 illustrates an LCD using an edge type backlight assembly.

Referring to FIG. 4, an LCD 600 includes a backlight assembly 500 for generating light, and a display unit 400 disposed over the backlight assembly 500 to display an image by using light received from the backlight assembly 500. The LCD 600 has a DBEF-P structure in which a DBEF 220 is attached to a lower polarization plate 200 of the display unit 400, and is characterized in that a brightness control plate 210 is interposed between the lower polarization plate 200 and the DBEF 220.

The brightness control plate 210 reduces the brightness of inclined incident light that is not perpendicular to an absorbing axis of the polarization plate and consequently prevents light leakage due to the inclined incident light in a normally black mode.

The backlight assembly 500 includes a lamp unit 510 for generating light, a light guide unit for guiding light from the lamp unit 510 to an LCD panel 100.

The display unit 400 includes the LCD panel 100, and lower and upper polarization plates 200 and 300 disposed under and over the LCD panel 100. The LCD panel 100 includes a TFT substrate 110 having an electrode formed thereon, a color filter substrate 120, and a liquid crystal layer (not shown) injected between the TFT substrate 110 and the color filter substrate 120.

In the embodiment illustrated in FIG. 4, the DBEF 220, which reflects a reflected and lost portion of light transmitted from the lamp unit 510 to the display unit 400 toward the display unit 400 to thereby improve light efficiency, is attached to a lower polarization plate 200 of the display unit 400, and is characterized in that the brightness control plate 210 is interposed between the lower polarization plate 200 and the DBEF 220.

Here, the brightness control plate 210 is made of polycabornate (PC) material, reduces the brightness of inclined incident light that is not perpendicular to an absorbing axis of the polarization plate and consequently prevents light leakage due to the inclined incident light in a normally black mode.

The lamp unit 510 includes a lamp 510a for generating light, and a lamp reflection plate 510b surrounding the lamp 510a. Light generated from the lamp 510a is inputted to a light guide plate 520, which will be described layer, and the lamp reflection plate 510b reflects light generated from the lamp 510a toward the light guide plate 520 to increase the amount of the light inputted to the light guide plate 520.

In the embodiment in FIG. 4, the LCD 600 is illustrated to have the light guide plate 520 because it uses an edge type backlight assembly. However, the present invention is not limited to this structure. For example, the LCD 600 need not have the light guide plate 520 when it uses a direct type backlight assembly.

The light guide unit includes a reflection plate 540, the light guide plate 520, and diffusion sheets 530a, 530a'. The light guide plate 520 is provided at one side of the lamp unit 510 to guide light from the lamp unit 510. At this time, the light guide plate 520 changes a path of light outputted from the lamp unit 510 to guide the light toward the LCD panel 100.

The reflection plate 540 is disposed beneath the light guide plate 520 to reflect light leaking from the light guide plate 520 toward the light guide plate 520.

The diffusion sheets 530a, 530a' are disposed over the light guide plate 520 to improve the efficiency of light outputted from the light guide plate 520.

FIG. 5 is a sectional view illustrating a structure of an LCD according to another embodiment of the present invention.

When compared to the embodiment in FIG. 4, the embodiment in FIG. 5 is characterized in that a DBEF 530b disposed between the diffusion sheets 530a.

Accordingly, the same reference numbers will be used throughout FIGS. 4 and 5 to refer to the same parts.

In the embodiment illustrated in FIG. 5, a brightness control plate 210 is attached on a lower surface of the lower polarization plate 200.

The brightness control plate 210 reduces the brightness of inclined incident light that is not perpendicular to an absorbing axis of the polarization plate and consequently prevents light leakage due to the inclined incident light in a normally black mode.

At this time, the brightness control plate 210 may be made of polycabornate (PC) material.

Figure 6A:
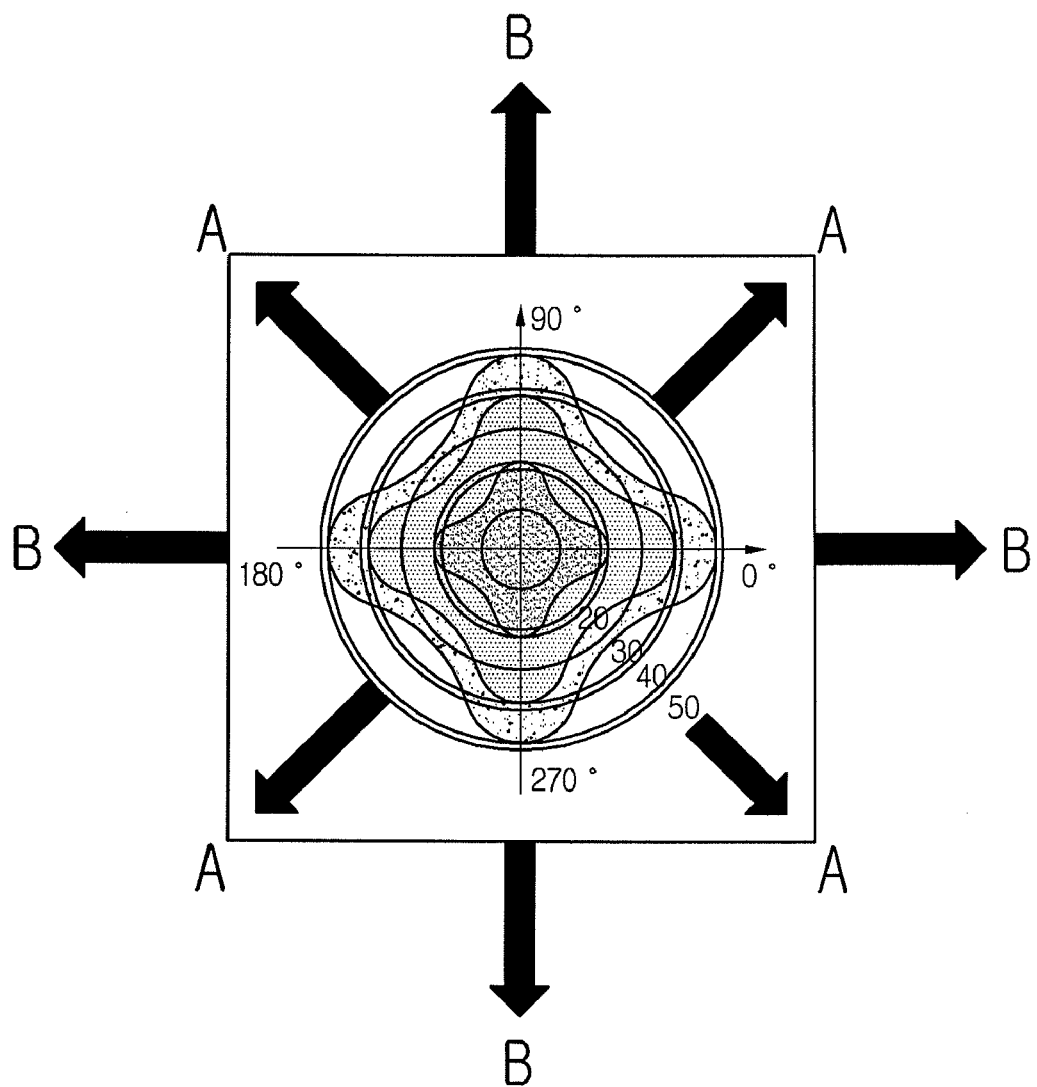

FIGS. 6A and 6B are diagrams illustrating that light leakage is prevented by the LCD according to the present invention.

FIG. 6A illustrates the brightness distribution of incident light according to its azimuthal angles in the display unit, and FIG. 6B is a graph illustrating a light transmittance according to polar angles of lights inputted to the polarization plate.

As shown in FIG. 6A, in the case of the LCD having the brightness control plate provided at the lower polarization plate, the brightness distribution of light becomes non-uniform. Accordingly, the brightness of light A whose azimuthal angle is not perpendicular or parallel to the light absorbing axis of the polarization plate becomes low. Consequently, a light leakage phenomenon that may be caused by an inclined incident light in a normally black mode can be reduced.

This is also illustrated in FIG. 6B. As illustrated in FIG. 6B, light inputted at an inclined angle of about 70° is highest in transmittance and causes light leakage. When the thickness of the brightness control plate is 0 (that is, the brightness control plate is not interposed), the light transmittance is highest. When the brightness control plate with a thickness of 20 or 40 nm is interposed, the light transmittance becomes lower.

Accordingly, when the brightness control plate is formed on the lower surface of the lower polarization plate, light leakage that may be generated due to the inclined incident light that is not perpendicular to the absorbing axis of the polarization plate can be overcome. Consequently, a high CR can be obtained.

As described above, the present invention attaches the brightness control plate on the lower surface of the lower polarization plate in the display unit. Accordingly, a light leakage phenomenon that may be generated due to the inclined incident light that is not perpendicular to the absorbing axis of the polarization plate can be prevented. Consequently, a high CR can be obtained.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD (liquid crystal display) comprising:
    a backlight assembly for generating light;
    a display unit disposed over the backlight assembly to display an image by using light received from the backlight assembly, the display unit including a lower polarization plate;
    a DBEF (dual brightness enhanced film) disposed under the lower polarization plate; and
    a brightness control plate interposed between the lower polarization plate and the DBEF to reduce the brightness of an inclined incident light in a normally black mode that is not perpendicular to an absorbing axis of the polarization plate wherein the brightness control plate has a thickness of about 40 nm.

2. The display according to claim 1, wherein the brightness control plate comprises PC (polycarbonate) material.

3. The display according to claim 1, wherein the backlight assembly comprises:
    a lamp unit for generating light; and
    a light guide unit for guiding the light from the lamp unit toward the display unit.

4. The display according to claim 3, wherein the backlight assembly further comprises:
    diffusion sheets disposed between the light guide unit and the display unit.

5. The display according to claim 1, wherein the display unit further comprises:
    an LCD panel including a TFT substrate having an electrode formed thereon, a color filter substrate, and a liquid crystal layer injected between the TFT substrate and the color filter substrate; and
    an upper polarization plate disposed over the LCD panel, the lower polarization plate disposed under the LCD panel.

6. The display according to claim 5, wherein the display unit further comprises the DBEF attached to the lower polarization plate through the brightness control plate.

7. A liquid crystal display comprising:
    a backlight assembly for generating light;
    a display unit disposed over the backlight assembly to display an image by using light received from the backlight assembly, the display unit having a lower polarization plate; and
    a brightness control plate attached to the lower polarization plate to reduce the brightness of inclined incident light in a normally black mode that is not perpendicular to an absorbing axis of the polarization plate wherein the brightness control plate has a thickness of about 40 nm.

8. The display according to claim 7, wherein the brightness control plate comprises PC (polycarbonate) material.

9. The display according to claim 7, wherein the backlight assembly comprises:
    a lamp unit for generating light; and
    a light guide unit including diffusion sheets and a DBEF (dual brightness enhanced film) to guide the light from the lamp unit toward the display unit.

10. The display according to claim 9, wherein the backlight assembly further comprises:
    the diffusion sheets disposed between the light guide unit and the display unit; and
    the DBEF disposed between the diffusion sheets.

11. The display according to claim 7, wherein the display unit comprises:
- an LCD panel including a TFT substrate having an electrode formed thereon, a color filter substrate, and a liquid crystal layer injected between the TFT substrate and the color filter substrate; and
- an upper polarization plate disposed over the LCD panel, the lower polarization plate disposed under the LCD panel.

12. A method of reducing light leakage in a black mode of a liquid crystal display, the method comprising:
- generating light;
- polarizing the light through a polarizing plate; and
- reducing a brightness of inclined incident light that is not perpendicular to an absorbing axis of the polarization plate prior to polarizing the light during the black mode of the liquid crystal display by a brightness control plate attached to the lower polarization plate,
- wherein the brightness control plate has a thickness of about 40 nm.

13. The method according to claim 12, further comprising reflecting a reflected and lost portion of light transmitted toward the polarizing plate using a DBEF (dual brightness enhanced film).

14. The method according to claim 13, further comprising limiting a thickness of the DBEF to about 40 nm.

15. The method according to claim 12, further comprising using PC (polycarbonate) to reduce the brightness of the inclined incident light.

* * * * *